(12) United States Patent
Chen et al.

(10) Patent No.: US 10,049,504 B2
(45) Date of Patent: Aug. 14, 2018

(54) ANNOTATING THREE-DIMENSIONAL DISPLAYS

(71) Applicant: HONEYWELL INTERNATIONAL INC., Morris Plains, NJ (US)

(72) Inventors: Henry Chen, Beijing (CN); Tom Plocher, Hugo, MN (US); Jian Geng Du, Beijing (CN); Liana M. Kiff, Minneapolis, MN (US)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/442,195

(22) Filed: Feb. 24, 2017

(65) Prior Publication Data
US 2017/0352196 A1 Dec. 7, 2017

Related U.S. Application Data

(63) Continuation of application No. PCT/CN2014/085143, filed on Aug. 26, 2014.

(51) Int. Cl.
*G06T 19/20* (2011.01)
*G06T 17/05* (2011.01)
*G06T 17/00* (2006.01)

(52) U.S. Cl.
CPC ............ *G06T 19/20* (2013.01); *G06T 17/005* (2013.01); *G06T 17/05* (2013.01); *G06T 2200/04* (2013.01); *G06T 2200/24* (2013.01); *G06T 2219/004* (2013.01); *G06T 2219/2012* (2013.01)

(58) Field of Classification Search
CPC ....... G06T 19/20; G06T 17/005; G06T 17/05; G06T 2200/24; G06T 2219/004; G06T 2219/2012; G06T 2200/04
See application file for complete search history.

(56) References Cited

U.S. PATENT DOCUMENTS

| 2011/0007134 | A1 | 1/2011 | Knize et al. |
| 2012/0296609 | A1 | 11/2012 | Khan et al. |
| 2013/0249906 | A1* | 9/2013 | Gunderson ............ G06T 15/20 345/420 |
| 2013/0314441 | A1* | 11/2013 | Grasset .................... G06T 1/00 345/633 |

(Continued)

FOREIGN PATENT DOCUMENTS

| CN | 103093061 A | 5/2013 |
| WO | 2002/093491 A1 | 11/2002 |

OTHER PUBLICATIONS

The International Search Report for related PCT Application PCT/CN2014/085143, dated May 28, 2015 (3 pages).

(Continued)

*Primary Examiner* — Maurice L. McDowell, Jr.
(74) *Attorney, Agent, or Firm* — Brooks, Cameron & Huebsch, PLLC

(57) ABSTRACT

Methods, systems, and devices for annotating three-dimensional displays are described herein. One method includes displaying, by a computing device, a particular view of a 3D model of a facility, the 3D model including a plurality of objects, each object associated with a respective annotation, determining a context associated with the 3D model, and displaying a subset of the plurality of annotations associated with a respective subset of the plurality of objects based on the context.

20 Claims, 6 Drawing Sheets

(56) References Cited

U.S. PATENT DOCUMENTS

| 2013/0321397 | A1  |        | 12/2013 | Chen et al. |           |
|--------------|-----|--------|---------|-------------|-----------|
| 2015/0130792 | A1  | *      | 5/2015  | Kunen       | G06T 17/05 |
|              |     |        |         |             | 345/419   |
| 2016/0104281 | A1  | *      | 4/2016  | Grady       | G06T 19/00 |
|              |     |        |         |             | 382/128   |
| 2018/0025538 | A1  | *      | 1/2018  | Jones       | G06T 19/00 |

OTHER PUBLICATIONS

Extended Search Report from related European Patent Application No. 14900670.2, dated Mar. 8, 2018, 8 pages.

* cited by examiner

ANNOTATING THREE-DIMENSIONAL DISPLAYS

CROSS REFERENCE TO RELATED APPLICATION

This application claims priority to PCT Application No. PCT/CN2014/085143, filed Aug. 26, 2014, which is incorporated herein by reference in its entirety.

TECHNICAL FIELD

The present disclosure relates to methods, systems, and devices for annotating three-dimensional displays.

BACKGROUND

A facility (e.g., a building, plant, refinery, etc.) can have a Building Information Model (e.g., BIM) associated with it. The BIM can be a digital representation of the physical and/or functional characteristics of the facility, for instance. Included in the BIM can be a three-dimensional (3D) model (e.g., representation, display, etc.) of the facility. The 3D model can show the layout of the facility, including spaces (e.g., rooms). The 3D model can include a number of objects (e.g., solid shapes and/or void-space oriented) that may carry their geometry (e.g., size, shape, dimensions, etc.), relations and/or properties (e.g., name, material, producer, type, etc.). For example, objects in the BIM can represent structural portions of the facility and/or devices therein.

When the 3D model is displayed, properties of objects may be displayed therein using text annotations. Similarly, state descriptions (e.g., real-time information, such as temperature, alarm(s), occupancy, etc.) of objects can be displayed using text annotations.

Previous approaches to annotating 3D displays may fix annotations to a "floor" or a "wall" of the 3D model, for instance. However, fixed annotations may become unreadable and/or disappear entirely if the model is rotated, causing object(s) to obscure them. Additionally, previous approaches to annotating 3D displays may encounter issues associated with annotations collapsing on one another as the display is zoomed out, for example, as well as other visual continuity issues (e.g., loss of context awareness) arising from user manipulation of the model.

DETAILED DESCRIPTION

Figure 1:
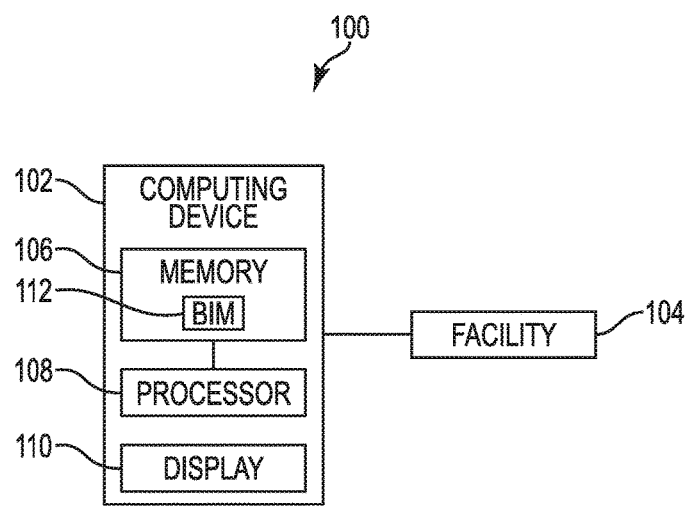
FIG. 1 illustrates a system for annotating a 3D display in accordance with one or more embodiments of the present disclosure.

Methods, systems, and devices for annotating 3D displays are described herein. One method includes displaying, by a computing device, a particular view of a 3D model of a facility, the 3D model including a plurality of objects, each object associated with a respective annotation, determining a context associated with the 3D model, and displaying a subset of the plurality of annotations associated with a respective subset of the plurality of objects based on the context.

Embodiments of the present disclosure can annotate 3D displays with consideration paid to the context of the 3D display. Whereas previous approaches may become unreadable in certain views, embodiments of the present disclosure can provide annotations that adapt to rotations of a 3D model, as well as varying levels of detail (e.g., zoom). Embodiments herein allow a user to maintain context awareness and visual continuity as a 3D model is manipulated (e.g., panned, rotated, zoomed, resized, etc.).

Additionally, embodiments of the present disclosure can display and/or highlight portions of the 3D model according to context. Context, as used herein, refers to one or more conditions affecting how one or more annotations are to be displayed (or not displayed).

Context can be determined based on information received from a subsystem of a building management system associated with the facility. For example, if an alarm is present in the facility, some embodiments can allow the display (e.g., the automatic display) of annotations associated with portions of the 3D model corresponding to the alarm. Other portions (e.g., portions not corresponding to the alarm) can be made invisible and/or dimmed.

Context can be determined based on user interaction with the 3D model. For example, an annotation can be displayed (or its display modified) responsive to a user clicking on, or hovering over, an object in the 3D model. Other annotations associated with other objects (e.g., unselected objects) can be made invisible and/or dimmed.

Thus, embodiments of the present disclosure can provide context-driven annotations that allow a user to visualize pertinent and/or desired information rather than an overabundance of annotations without any context that may be prevalent in previous approaches. Additionally, some embodiments can annotate the 3D display without occlusions caused by annotations. In contrast to previous approaches where annotations may overlap in certain views rendering them unreadable, embodiments described herein can provide annotations that are readable irrespective of view.

In some embodiments, annotations that would otherwise be occluded can be offset (e.g., relocated) and linked to their corresponding object, for instance, by a line (e.g., line segment). In other embodiments, annotations that would otherwise occlude other annotations can be dimmed.

To avoid visual discontinuities, embodiments of the present disclosure can take into account a layout of a previous frame of the 3D model while a user is manipulating the 3D model. Accordingly, users can maintain context awareness as they interact with the 3D model because, for example, users can visualize any changes (e.g., movement, resizing, color changing, etc.) to annotations as they occur.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of objects" can refer to one or more objects.

FIG. 1 illustrates a system 100 for annotating a 3D display in accordance with one or more embodiments of the present disclosure. As shown in FIG. 1, system 100 includes a computing device 102 communicatively coupled to a facility 106. A communicative coupling can allow data to be communicated in either direction between the computing device 102 and the facility 104. Though the computing device 102 is shown as being separate from the facility 104, embodiments of the present disclosure are not so limited. That is, computing device 102 can be located within the facility 104, for example.

As shown in the embodiment illustrated in FIG. 1, the computing device 102 can include a memory 106 and a processor 108. Memory 106 can be any type of storage medium that can be accessed by processor 108 to perform various examples of the present disclosure. For example, memory 106 can be a non-transitory computer readable medium having computer readable instructions (e.g., computer program instructions) stored thereon that are executable by processor 108 for annotating a 3D display in accordance with one or more embodiments of the present disclosure.

Memory 106 can be volatile or nonvolatile memory. Memory 106 can also be removable (e.g., portable) memory, or non-removable (e.g., internal) memory. For example, memory 106 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 106 is illustrated as being located in computing device 102, embodiments of the present disclosure are not so limited. For example, memory 106 can also be located internal to another computing resource (e.g., enabling computer readable instructions to be downloaded over the Internet or another wired or wireless connection).

Memory 106 can store a building information model (BIM) 112 associated with the facility 104. The BIM 112 can be a digital representation of the physical and/or functional characteristics of the facility 104, for instance. Included in the BIM 112 can be a 3D model (e.g., representation, display, etc.) of the facility 104. The 3D model can show the layout of the facility 104, including spaces (e.g., rooms). The 3D model can include a number of objects (e.g., solid shapes and/or void-space oriented) that may carry their geometry (e.g., size, shape, dimensions, etc.), relations and/or properties (e.g., name, material, producer, type, etc.). For example, objects in the BIM 112 can represent structural portions of the facility 104 and/or devices therein.

Computing device 102 includes a display 110. The display 110 (e.g., screen) can be configured to display one or more embodiments herein for instance. Though display 110 is shown as being included in computing device 102, display 110 can be external to computing device 102.

In some embodiments, the display 110 can be a head-mounted display (HMD), for instance (e.g., head-mounted glasses). In other embodiments, the display 110 can be a video wall. In other embodiments, the display 110 can be a mobile device (e.g., mobile phone, tablet, personal digital assistant (PDA), etc.). In various embodiments, more than one display can be utilized. The display 110 can be, for instance, a touch-screen (e.g., the display can include touch-screen capabilities).

The display 110 can provide (e.g., display and/or present) information to a user (e.g., a user using computing device 102). Computing device 102 can receive information from a user through an interaction with the user via the display 110. For example, computing device 102 can receive inputs from the user via the display 110. The user can enter the input into computing device 102 using, for instance, a mouse and/or keyboard associated with computing device 102, or by touching the display in embodiments in which the display includes touch-screen capabilities (e.g., embodiments in which the display is a touch screen).

Figure 2:
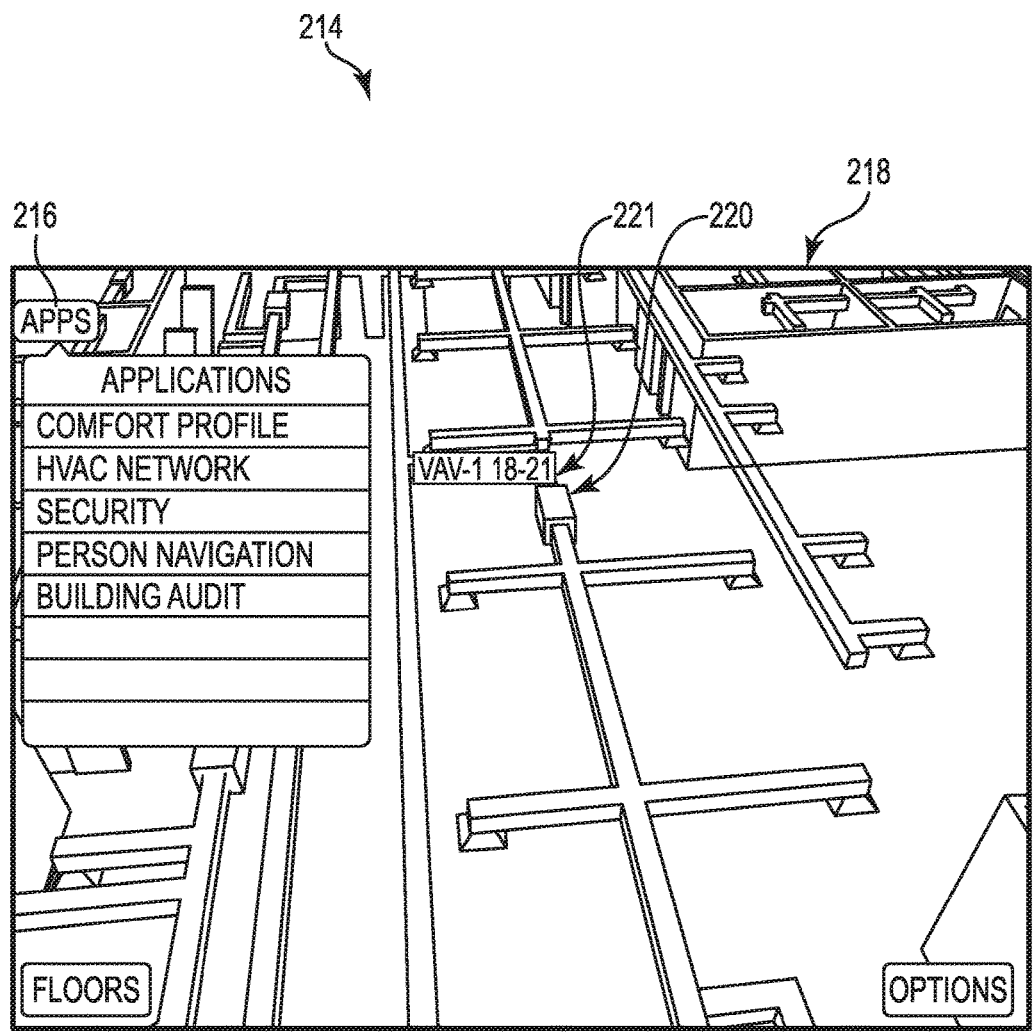
FIG. 2 illustrates an example display of a portion of an annotated 3D display in accordance with one or more embodiments of the present disclosure.

FIG. 2 illustrates an example display 214 of a portion of an annotated 3D display in accordance with one or more embodiments of the present disclosure. As previously discussed, embodiments of the present disclosure can display and/or highlight portions of the 3D model according to context. In the example illustrated in FIG. 2, the context is being provided (e.g., determined) based on user inputs.

Display 214 includes an applications icon 216. A user can select the applications icon 216 by the actuation of an input device (e.g., a mouse click). Responsive to the selection, a menu 218 can be displayed. The menu 218 can include applications (e.g., subsystems) of a building management system associated with the facility. As shown, example applications can include comfort profile, HVAC network, security, person navigation, and building audit. It is to be understood that the applications listed in FIG. 2 are included for purposes of illustration and are not intended to limit embodiments of the present disclosure to particular applications.

In the example shown, a user has selected "HVAC Network" from menu 218. That selection can cause the display of annotations associated with objects of the HVAC network, for instance. For example, the annotation 221 is displayed in association with its associated device (e.g., "owner"), variable air volume (VAV) device 220 (a device of the HVAC network).

Annotations can include names and/or properties of objects. Annotations can include state descriptions (e.g., real-time information, such as temperature, alarm(s), occupancy, etc.) of objects. Annotations can be displayed as "billboards" (e.g., billboard text annotations). That is, annotations can be a "sign" or a "card" that sits on the floor of the facility vertically. Annotations can be sensitive to a rotational position of the 3D model. As the 3D model rotates, annotations can change orientation to counter the rotation such that they are in a readable orientation irrespective of view.

"View," as used herein, can refer to a particular aspect, virtual vantage point, rotational position, and/or zoom level of the 3D model. A view can refer to an appearance of the 3D model while the 3D model is at a particular rotational position and/or zoom level. In some embodiments, a view can include a portion (e.g., a room, a wall, a device, a wing, etc.) of the facility. In other embodiments, a view can include the entire facility. A view may be horizontal, vertical (e.g., birds eye), and/or angles between. A view may be of an exterior of the facility and/or an interior of the facility.

In some embodiments, an annotation associated with an object may not be displayed in a particular view if the object is not visible. That is, embodiments of the present disclosure can determine whether a particular object is visible in a particular view and not display an annotation associated with the particular object responsive to a determination that the object is not visible in the particular view. To reduce user confusion, annotations associated with hidden (e.g., obscured) objects can be withheld from the display.

As previously discussed, annotations can include, among other information, names and/or properties of objects, as well as state descriptions of objects. Such information can be received from a BIM associated with the facility (e.g., BIM 112, previously described in connection with FIG. 1). In some embodiments, the information can be received upon the creation and/or receipt of the BIM. In some embodiments, the information can be received as it is determined (e.g., in real-time), for instance. The information can be received from a number of subsystems of a building management system associated with the facility, previously discussed. The information may be determined by a number of devices of the subsystems, such as, for example, cameras, sensors, alarms, card readers, thermostats, etc.

In some embodiments, annotations can be displayed using different colors. For example, particular objects (e.g., doors) in a 3D model can be displayed in a particular color (e.g., yellow). The coloration may be derived from the BIM. The coloration may depend on the material constituting the object, for instance.

Embodiments of the present disclosure can display an annotation associated with the particular object (e.g., the door) using the particular color (e.g., yellow). That is, embodiments can determine a color of a particular object in the model and display an annotation associated with the particular object using the color. Thus, the color of the object can match the color of its annotation. The text of the annotation itself may be displayed using particular colors and/or a box surrounding the text may be displayed using particular colors. While coloration of objects may be provided by the BIM, embodiments of the present disclosure can allow a user to modify and/or change colors of objects, subsystems, annotations, etc.

As previously discussed, the context can be determined based on an indication, made by a user, associated with a particular portion of the 3D model. In some embodiments, such an indication can be made by the actuation of an input device (e.g., the clicking of a mouse on a desired object). In some embodiments, the indication can be made by an input device remaining within the particular portion of the 3D model for a period of time exceeding a particular time threshold (e.g., the hovering of the mouse over the desired object).

The user indication can cause the display of an annotation to be modified. For example, additional information associated with the object can be displayed in the annotation. In another example, the annotation can increase in dimension (e.g., be displayed in a larger font) responsive to the indication being made. In some embodiments, other annotations associated with other objects (e.g., unselected objects) can be made invisible and/or dimmed responsive to the indication.

The context can be determined based on information received from a subsystem of a building management system associated with the facility. The information can be determined by a number of devices of the subsystems, such as, for example, cameras, sensors, alarms, card readers, thermostats, etc. In an example, an abnormal status (e.g., temperature exceeding a threshold, alarm condition, etc.) can be determined. Annotations associated with objects of the subsystem can be displayed according to the context dictated by the information received from the subsystem.

Figure 3:
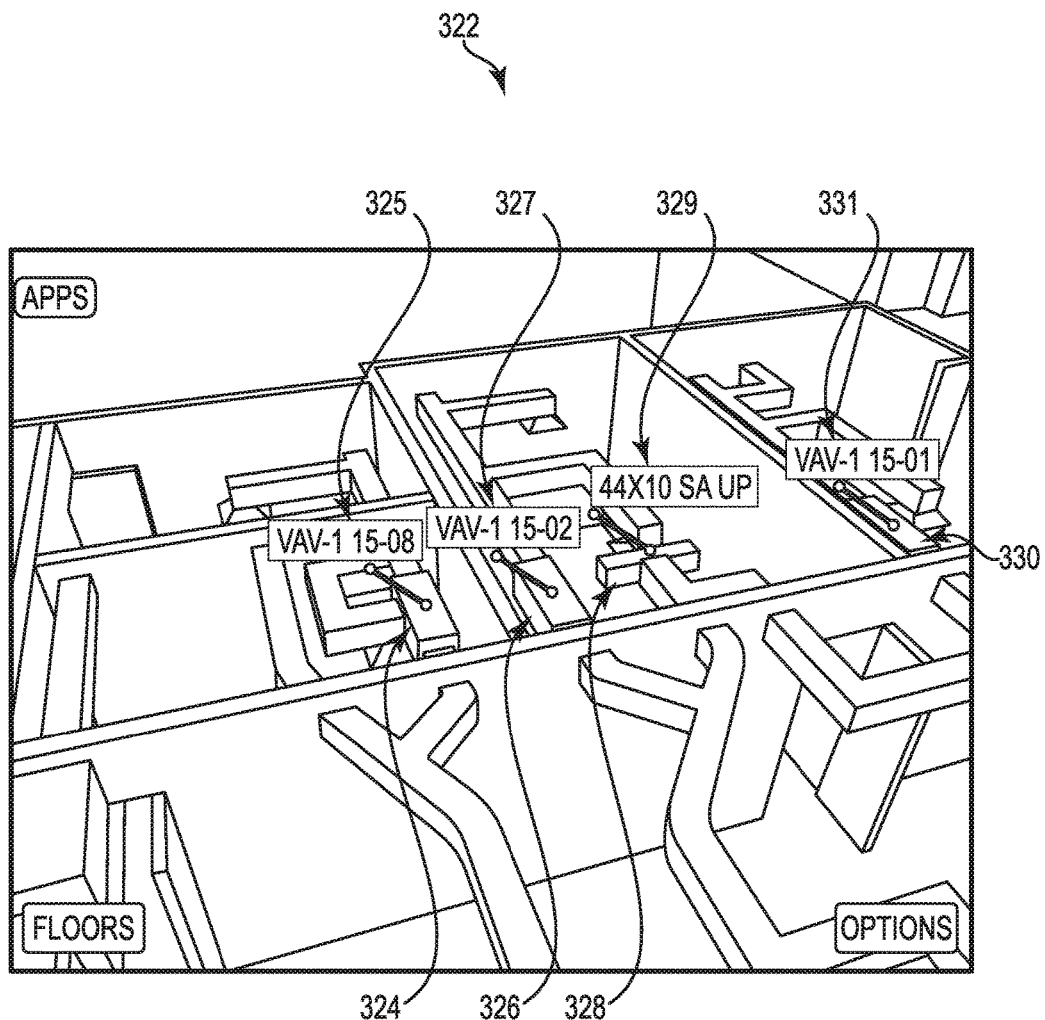
FIG. 3 illustrates another example display of a portion of an annotated 3D display in accordance with one or more embodiments of the present disclosure.

FIG. 3 illustrates another example display 322 of a portion of an annotated 3D display in accordance with one or more embodiments of the present disclosure. Display 322 illustrates a different view than display 214, previously discussed in connection with FIG. 2. The example display 322 illustrates another embodiment of the present disclosure wherein annotations can be linked with their associated objects (owners) by a line (e.g., line segment). Such embodiments may include instances where annotations have been offset (discussed below in connection with FIGS. 5-6B), for instance, and thus may no longer be located immediately above associated objects.

For instance, a first VAV device 324 is linked with a first VAV device annotation 325; a second VAV device 326 is linked with a second VAV device annotation 327; a third VAV device 328 is linked with a third VAV device annotation 329; and a fourth VAV device 330 is linked with a fourth VAV device annotation 331. Embodiments using lines such as that shown in example display 322 can allow users to avoid confusion in instances where there are multiple annotations in a confined space.

Figure 4:
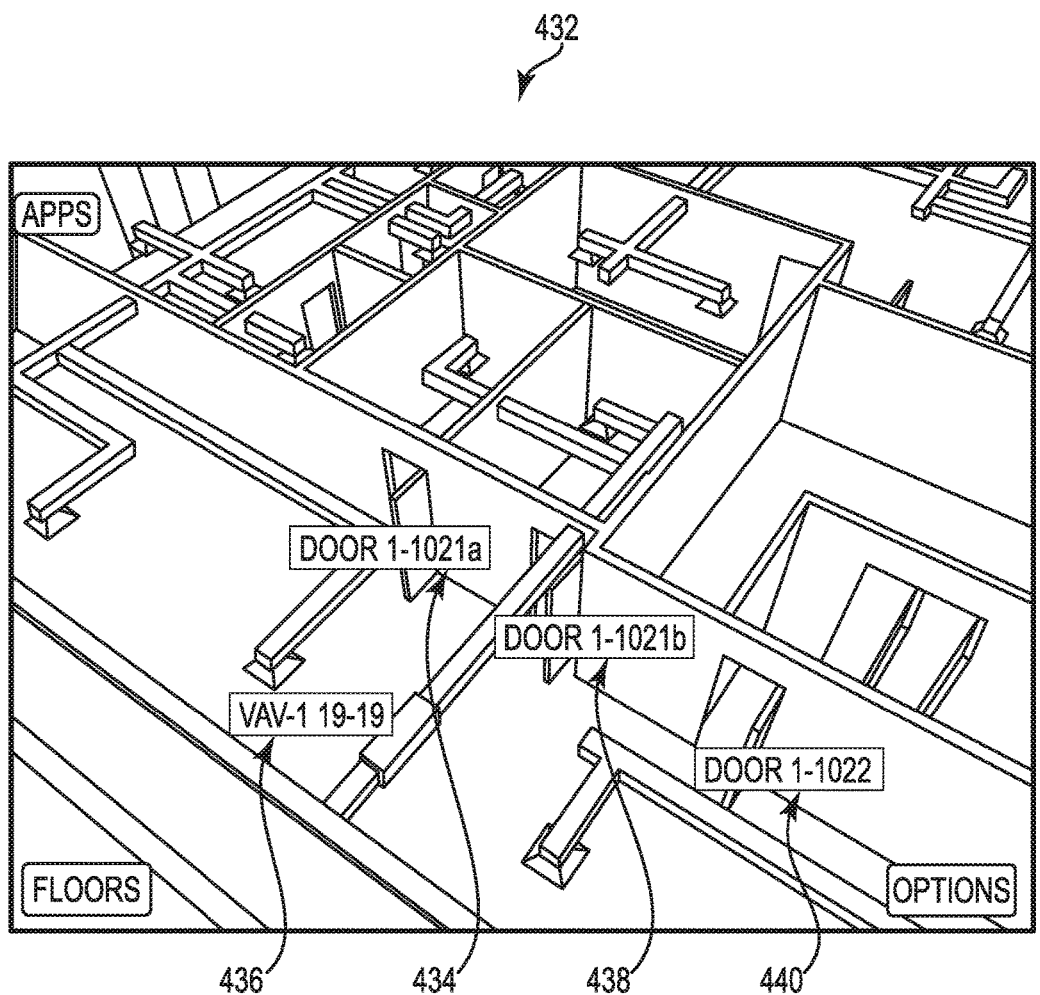
FIG. 4 illustrates another example display of a portion of an annotated 3D display in accordance with one or more embodiments of the present disclosure.

FIG. 4 illustrates another example display 432 of a portion of an annotated 3D display in accordance with one or more embodiments of the present disclosure. Display 432 illustrates a different view than display 214, previously described in connection with FIG. 2, and display 322, previously described in connection with FIG. 3.

The example display 432 illustrated in FIG. 4 shows an embodiment wherein annotations are enclosed in rectangles. For instance, the example display 432 includes a first door annotation 434, a VAV device annotation 436, a second door annotation 438, and a third door annotation 440. Enclosing annotations in rectangles can allow the annotations to be better visualized, for instance. Further, the use of rectangles can allow embodiments of the present disclosure to expediently correct occlusion issues prevalent in previous approaches.

Figure 5:
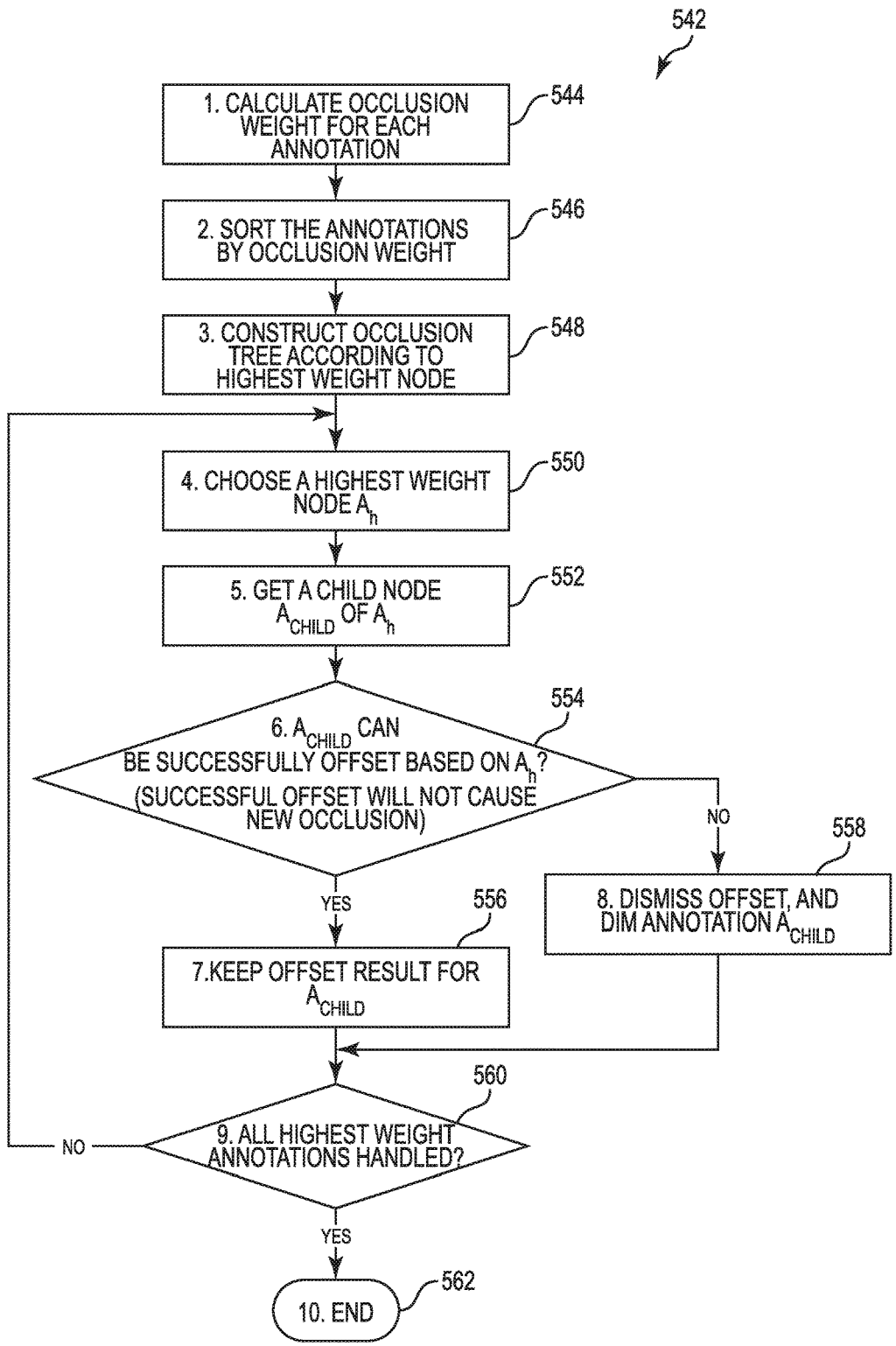
FIG. 5 illustrates a flow chart associated with annotating a 3D display in accordance with one or more embodiments of the present disclosure.

FIG. 5 illustrates a flow chart 542 associated with annotating a 3D display in accordance with one or more embodiments of the present disclosure. The steps of the flow chart 542 can be performed by a computing device (e.g., computing device 102, previously described in connection with FIG. 1), for instance.

Though not shown in FIG. 5, flow chart 542 can include displaying a particular view of a 3D model of a facility, the 3D model including a plurality of objects, each object associated with a respective annotation. Further, the plurality of annotations can be prioritized according to a context associated with the 3D model. That is, which (e.g., which type of) annotations are to be displayed can be determined according to the context.

Of the prioritized annotations, a subset of annotations can be determined that are associated with objects visible in the particular view. As previously discussed, if an object is not visible in a particular view, its annotation may not be displayed in some embodiments. Accordingly, flow chart 542 can be considered to only include annotations (e.g., a plurality of annotations) that are displayed in accordance with context and in accordance with objects that are visible (e.g., in the current view). It is noted that the steps of FIG. 5 are, in part, illustrated by the example annotations shown in FIGS. 6A-6D.

At block 544, a respective occlusion weight for each annotation of the plurality of annotations can be determined. An occlusion weight can be a number of annotations occluding (or occluded by) a particular annotation. Occlusions can be total occlusions and/or partial occlusions. At block 546, the plurality of annotations can be sorted according to the respective occlusion weights.

At block 548, an occlusion tree can be determined according to an annotation of the plurality of annotations having a highest occlusion weight (e.g., highest weight node). The occlusion tree can be a relational mapping of annotations that occlude other annotations. At block 550, the annotation of the plurality of annotations having the highest occlusion weight can be selected and deemed $A_h$, for instance.

At block 552, an occluded annotation that is occluded by the annotation of the plurality of annotations having the highest occlusion weight can be determined. Such an annotation can be deemed a "child node," $A_{child}$, of $A_h$.

At block 554, a determination can be made regarding whether the occluded annotation ($A_{child}$) can be offset based on the annotation of the plurality of annotations having the highest occlusion weight ($A_h$). The determination can include determining whether such an offset would cause another (e.g., new) occlusion, for instance.

A direction of the offset can be determined based on the occlusion tree, for instance. A direction of the offset can be determined based on a relationship (e.g., distance, orientation, direction, etc.) between a center of the occluded annotation (e.g., a rectangle around the occluded annotation) and a center of the annotation having the highest occlusion (e.g., a rectangle around the annotation having the highest occlusion).

If the occluded annotation ($A_{child}$) can be offset, the offset result for the occluded annotation can be retained at block 556. That is, responsive to a determination that offsetting the occluded annotation will not cause the occluded annotation to occlude any other annotation of the plurality of annotations, the occluded annotation can be offset.

If offsetting the occluded annotation will cause the occluded annotation to occlude any other annotation, the occluded annotation can be dimmed at block 558. Dimming can reduce a brightness of the occluded annotation, for instance. In some embodiments, the brightness can be reduced by a particular amount.

At block 560, a determination is made regarding whether any other (e.g., all) highest-weight annotations have had their respective occluded annotations offset and/or dimmed. If so, flow chart 542 ends at block 562. If any other highest-weight annotations have occluded annotations associated therewith, flow chart 542 can return to block 550, for instance.

FIGS. 6A-6D illustrate example annotations displayed according to the flow chart illustrated in FIG. 5. FIGS. 6A-6D include a first annotation VAV-1-19-12 664 (hereinafter referred to as "VAV12 664"); a second annotation VAV-1-19-10 (hereinafter referred to as "VAV10 666"); a third annotation VAV-1-19-18 (hereinafter referred to as "VAV18 668); and a fourth annotation VAV-1-19-13 (hereinafter referred to as "VAV13 670").

Figure 6A:
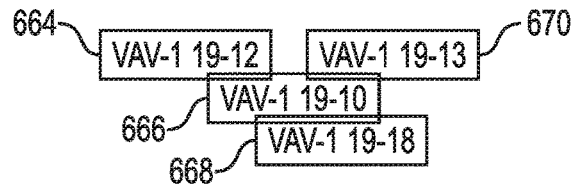
FIG. 6A illustrates example annotations displayed in a particular view of a 3D display in accordance with one or more embodiments of the present disclosure.

FIG. 6A illustrates example annotations displayed in a particular view of a 3D display in accordance with one or more embodiments of the present disclosure. As shown in FIG. 6A, VAV10 666 occludes each of VAV12 664, VAV18 668, and VAV13 670. Accordingly, an occlusion weight of VAV10 666 can be determined to be 3. Because each of VAV12 664, VAV18 668, and VAV13 670 are occluded by only one other annotation (VAV10 666), they can each be determined to have an occlusion weight of 1.

Figure 6B:
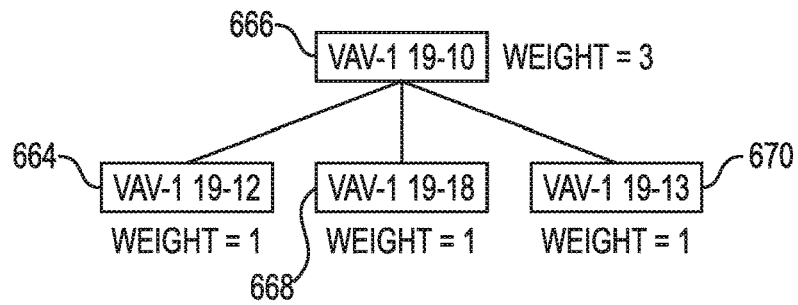
FIG. 6B illustrates an occlusion tree using the example annotations of FIG. 6A in accordance with one or more embodiments of the present disclosure.

FIG. 6B illustrates an occlusion tree using the example annotations of FIG. 6A in accordance with one or more embodiments of the present disclosure. As shown, VAV10 666 is connected by a respective line segment to each of VAV12 664, VAV18 668, and VAV13 670. The amount of connections to other annotations that a particular annotation has in its occlusion tree can allow the visualization and/or determination of an occlusion weight for that annotation, for instance.

Figure 6C:
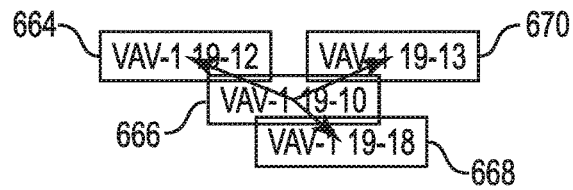
FIG. 6C illustrates offset directions for the example annotations of FIG. 6A in accordance with one or more embodiments of the present disclosure.

FIG. 6C illustrates offset directions for the example annotations of FIG. 6A in accordance with one or more embodiments of the present disclosure. As previously discussed, an offset direction can be determined based on the occlusion tree, for instance. An offset direction can be determined based on a relationship (e.g., distance, orientation, direction, etc.) between a center of the occluded annotation (e.g., a rectangle around the occluded annotation) and a center of the annotation having the highest occlusion weight (e.g., a rectangle around the annotation having the highest occlusion weight).

As shown in FIG. 6C, lines (e.g., rays) pointing away from the center of VAV10 666 can indicate offset directions for VAV12 664, VAV18 668, and VAV13. In some embodiments, an offset distance can be a minimum distance of offset such that the occlusion is corrected. In other embodiments, an offset distance can include ensuring the existence of a particular space and/or distance between the annotation rectangles such that following the offset the rectangles are separated for purposes of readability and/or clarity. That is, some embodiments can offset the occluded annotation by a particular distance such that a particular space is displayed between the offset occluded annotation and the annotation of the plurality of annotations having the highest occlusion weight.

Figure 6D:
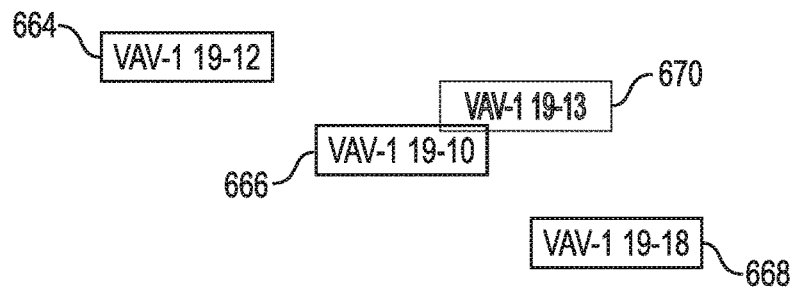
FIG. 6D illustrates modification of display aspects of the example annotations of FIG. 6A in accordance with one or more embodiments of the present disclosure.

FIG. 6D illustrates modification of display aspects of the example annotations of FIG. 6A in accordance with one or more embodiments of the present disclosure. In some embodiments, modification of display aspects of annotations can include dimming annotations. In other embodiments, modification of display aspects can include offsetting annotations.

As shown in the example illustrated in FIG. 6D, VAV12 664 and VAV18 668 have been offset. Accordingly, VAV12 664 and VAV18 668 no longer occlude VAV10 666. Though not shown for purposes of clarity, the presence of an additional annotation located adjacent to (e.g., to the right of) VAV13 670 would have caused VAV13 670 to occlude the additional annotation had VAV13 670 been offset. Accordingly, VAV13 670 is displayed as dimmed and has not been offset.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for annotating a three-dimensional (3D) display, comprising:
   displaying, by a computing device, a particular view of a 3D model of a facility, the 3D model including a plurality of objects, each object associated with a respective annotation;
   determining a context associated with the 3D model; and
   displaying a subset of the plurality of annotations associated with a respective subset of the plurality of objects based on the context.

2. The method of claim 1, wherein determining the context associated with the 3D model includes determining a portion of the plurality of objects visible in the particular view.

3. The method of claim 1, wherein determining the context associated with the 3D model includes receiving information from a subsystem of a building management system associated with the facility.

4. The method of claim 3, wherein the method includes determining an abnormal status associated with the subsystem based on the received information, and wherein the subset of the plurality of objects includes at least one object associated with the subsystem.

5. The method of claim 1, wherein determining the context associated with the 3D model includes receiving an indication, made by a user, associated with a particular portion of the 3D model.

6. The method of claim 5, wherein the indication is made by an actuation of an input device.

7. The method of claim 5, wherein the indication is made by an input device remaining within the particular portion of the 3D model for a period of time exceeding a particular time threshold.

8. The method of claim 1, wherein the method includes:
   determining whether a particular object of the plurality of objects is visible in the particular view; and
   not displaying an annotation associated with the particular object responsive to a determination that the object is not visible in the particular view.

9. The method of claim 1, wherein the method includes dimming an annotation of the plurality of annotations not included in the subset of the plurality of annotations associated with the respective subset of the plurality of objects based on the context.

10. The method of claim 1, wherein the method includes determining a color of a particular object of the subset of the plurality of objects and displaying an annotation associated with the particular object using the color.

11. A computing device for annotating a three-dimensional (3D) display, comprising:
    a memory; and
    a processor configured to execute instructions stored on the memory to:
    display a particular view of a 3D model of a facility, the 3D model including a plurality of objects, each object associated with a respective annotation;
    prioritize the plurality of annotations according to a context associated with the 3D model;
    determine a subset of the prioritized plurality of annotations associated with objects visible in the particular view; and
    display the subset of the prioritized plurality of annotations such that each annotation of the subset of the prioritized plurality of annotations does not occlude another annotation of the subset of the prioritized plurality of annotations.

12. The computing device of claim 11, wherein the processor is configured to execute instructions stored on the memory to:
    determine a respective occlusion weight for each annotation of the subset of the prioritized plurality of annotations;
    sort the subset of the prioritized plurality of annotations according to the respective occlusion weights;
    determine an occlusion tree according to an annotation of the subset of the prioritized plurality of annotations having a highest occlusion weight; and
    modify a display aspect of an annotation of the subset of the prioritized plurality of annotations not having the highest occlusion weight.

13. The computing device of claim 12, wherein the instructions stored on the memory to modify the display aspect of the annotation of the subset of the prioritized plurality of annotations not having the highest occlusion weight include instructions to dim the annotation of the subset of the prioritized plurality of annotations not having the highest occlusion weight.

14. The computing device of claim 12, wherein the instructions stored on the memory to modify a display aspect of the annotation of the subset of the prioritized plurality of annotations not having the highest occlusion weight include instructions to offset the annotation of the subset of the prioritized plurality of annotations not having the highest occlusion weight.

15. The computing device of claim 14, wherein the instructions to offset the annotation of the subset of the prioritized plurality of annotations not having the highest occlusion weight include instructions to display a line connecting the annotation of the subset of the prioritized plurality of annotations not having the highest occlusion weight with an object associated with the annotation of the subset of the prioritized plurality of annotations not having the highest occlusion weight.

16. A non-transitory computer-readable medium having instructions stored thereon executable by a processor to:
    cause a display of a particular view of a 3D model of a facility, the 3D model including a plurality of objects, each object associated with a respective annotation;
    determine a respective occlusion weight for each annotation of the plurality of annotations;
    sort the plurality of annotations according to the respective occlusion weight;
    determine an occlusion tree according to an annotation of the plurality of annotations having a highest occlusion weight;
    determine an occluded annotation that is occluded by the annotation of the plurality of annotations having the highest occlusion weight; and
    offset the occluded annotation responsive to a determination that offsetting the occluded annotation will not cause the occluded annotation to occlude any other annotation of the plurality of annotations.

17. The computer-readable medium of claim 16, wherein the instructions include instructions executable by the processor to dim the occluded annotation responsive to a determination that offsetting the occluded annotation will cause the occluded annotation to occlude any other annotation of the plurality of annotations.

18. The computer-readable medium of claim 16, wherein the instructions include instructions executable by the processor to offset the occluded annotation in a particular direction determined based, at least in part, on a relationship between a center of the occluded annotation and a center of the annotation having the highest occlusion weight.

19. The computer-readable medium of claim 16, wherein the instructions include instructions executable by the processor to offset the occluded annotation by a particular distance such that a particular space is displayed between the offset occluded annotation and the annotation of the plurality of annotations having the highest occlusion weight.

20. The computer-readable medium of claim 16, wherein the instructions include instructions executable by the processor to display each of the plurality of annotations enclosed in a respective rectangle.

* * * * *